(12) United States Patent
Schmid et al.

(10) Patent No.: US 9,991,768 B2
(45) Date of Patent: Jun. 5, 2018

(54) WINDSCREEN WIPER MOTOR AND SUPPRESSION ASSEMBLY FOR A WINDSCREEN WIPER MOTOR

(71) Applicant: Valeo Wischersysteme GmbH, Bietigheim-Bissingen (DE)

(72) Inventors: Bernd Schmid, Lauffen (DE); Jörg Bürkle, Grossachsenheim (DE); Siegfried Stefani, Oberriexingen (DE); Timo Rukwid, Bietigheim-Bissingen (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 645 days.

(21) Appl. No.: 14/387,672

(22) PCT Filed: Mar. 28, 2013

(86) PCT No.: PCT/EP2013/056782
§ 371 (c)(1),
(2) Date: Sep. 24, 2014

(87) PCT Pub. No.: WO2013/144322
PCT Pub. Date: Oct. 3, 2013

(65) Prior Publication Data
US 2015/0084459 A1 Mar. 26, 2015

(30) Foreign Application Priority Data
Mar. 30, 2012 (DE) .................. 10 2012 102 811

(51) Int. Cl.
*H02K 11/02* (2016.01)
*H01R 39/38* (2006.01)
(Continued)

(52) U.S. Cl.
CPC .............. *H02K 11/026* (2013.01); *B60S 1/08* (2013.01); *H01R 39/025* (2013.01); *H01R 39/38* (2013.01);
(Continued)

(58) Field of Classification Search
CPC ........ H02K 11/02–11/028; H02K 5/22; H02K 13/006; H01R 39/025; H01R 39/38
(Continued)

(56) References Cited

U.S. PATENT DOCUMENTS 5,140,207 A * 8/1992 Baumeister ............... B60S 1/08
310/71
5,194,769 A * 3/1993 Ade .......................... B60S 1/08
310/51
(Continued)

FOREIGN PATENT DOCUMENTS

DE      92 12 457 U1      11/1992
DE      696 01 270 T2      5/1999
(Continued)

OTHER PUBLICATIONS

Machine Translation, Silva et al., WO 2006027290 A1, Mar. 16, 2006.*
(Continued)

*Primary Examiner* — Thomas Truong
(74) *Attorney, Agent, or Firm* — Osha Liang LLP

(57) ABSTRACT

A windscreen wiper motor with a housing is disclosed. In the housing, an armature shaft is arranged with a commutator which cooperates with carbon elements arranged in the region of a carbon holder plate, which elements are connected in an electrically conducting manner with voltage supply lines via electrical connections, preferably in the form of carbon strands. The voltage supply lines are connected with the electrical connections via a suppression
(Continued)

Figure 1:
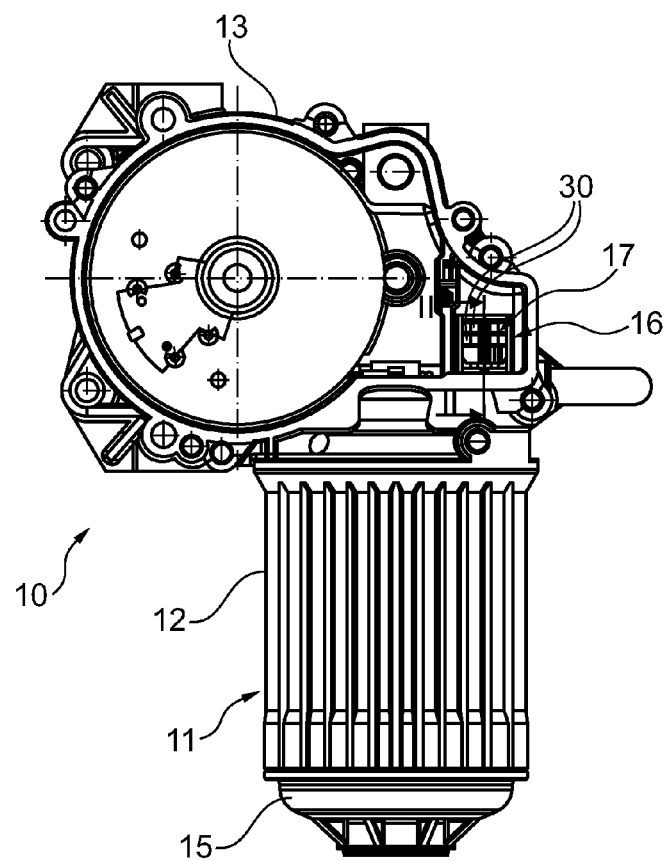

device arranged at least substantially in a suppression housing, which is connected with the carbon holder plate, and the voltage supply lines are connected with at least one plug connection element, which is able to be connected to a plug connection region of the housing with mating plug connectors on the vehicle side.

9 Claims, 3 Drawing Sheets

(51) Int. Cl.
H02K 5/22 (2006.01)
H02K 11/026 (2016.01)
H02K 11/22 (2016.01)
B60S 1/08 (2006.01)
H01R 39/02 (2006.01)
H02K 13/00 (2006.01)

(52) U.S. Cl.
CPC ............ *H02K 5/22* (2013.01); *H02K 11/022* (2013.01); *H02K 13/006* (2013.01)

(58) Field of Classification Search
USPC .............................................. 310/68 R, 68 C
See application file for complete search history.

(56) References Cited

U.S. PATENT DOCUMENTS

| | | | |
|---|---|---|---|
| 6,104,110 A * | 8/2000 | Uchida | H02K 11/026 310/239 |
| 6,677,693 B2 * | 1/2004 | Ooyama | H02K 5/148 310/233 |
| 2001/0017495 A1 | 8/2001 | Sato et al. | |
| 2006/0163958 A1 * | 7/2006 | Yagi | B60S 1/0803 310/71 |
| 2012/0013226 A1 * | 1/2012 | Stubner | H02K 11/026 310/68 R |
| 2012/0161561 A1 * | 6/2012 | Kuhnen | H02K 5/148 310/72 |

FOREIGN PATENT DOCUMENTS

| | | |
|---|---|---|
| DE | 103 18 734 A1 | 11/2004 |
| DE | 103 26 255 A1 | 1/2005 |
| DE | 10 2009000024 A1 | 7/2010 |
| JP | S58-79452 A | 5/1983 |
| WO | 2006/027290 A1 | 3/2006 |

OTHER PUBLICATIONS

Office Action issued in corresponding Mexican Application No. MX/a/2014/011768 dated Aug. 14, 2015, and English translation thereof (4 pages).

International Search Report issued in PCT/EP2013/056782 dated Oct. 29, 2013 (3 pages).

German Search Report issued in 10 2012 102 811.7 dated Feb. 6, 2013 (2 pages).

Office Action Issued in Corresponding Chinese Application No. 201380014360.0, dated Mar. 31, 2016 (15 Pages with English Translation).

* cited by examiner

WINDSCREEN WIPER MOTOR AND SUPPRESSION ASSEMBLY FOR A WINDSCREEN WIPER MOTOR

PRIOR ART

The invention relates to a windscreen wiper motor according to the preamble of Claim 1. The invention also relates to a suppression assembly for a windscreen wiper motor.

A windscreen wiper motor according to the preamble of Claim 1 is already known from practice. It has an armature shaft with a commutator which is arranged on the said armature shaft and is arranged so as to be operatively connected to carbon elements which, in turn, are supplied with voltage by means of the cable harness of the motor vehicle via voltage supply lines. It is also known that the voltage supply lines are not intended to be directly connected to the carbon elements or the connection strands of the said carbon elements, but rather that a suppression device, which is arranged within the housing of the windscreen wiper motor in the region the carbon holder plate which is also fitted with the carbon elements, is intended to be provided or interconnected. A suppression device of this kind or the components of a suppression device of this kind are arranged in a suppression housing which, in order to avoid short circuits, is composed of plastic. In the case of electrically operated components which are arranged in a motor vehicle, the electromagnetic compatibility (EMC) of the said components is important, that is to say that as little electromagnetic radiation as possible should be emitted to the outside by the electrical motor vehicle components since the said electromagnetic radiation can induce interference voltages in electrical lines which are routed past the electrical components, and these interference voltages can lead to malfunctions in the motor vehicle. The electromagnetic compatibility of the known windscreen wiper motors with components of the suppression device which are arranged in a suppression housing is not yet optimal in the case of increased requirements and it is always desirable for electromagnetic radiation emission to be as low as possible.

DISCLOSURE OF THE INVENTION

Proceeding from the described prior art, the invention is based on the object of developing a windscreen wiper motor according to the preamble of Claim 1 in such a way that the said windscreen wiper motor has a reduced level of electromagnetic radiation emission. According to the invention, this object is achieved in the case of a windscreen wiper motor having the features of claim 1 in that the suppression device between the carbon holder plate and the plug connection element comprises on the side facing the plug connection at least one metallic shielding element, in that the shielding element is arranged in the housing, which is metallic at least in the region of the plug connection region, and lies at least partially against wall sections lying at ground potential, surrounding the shielding element, and in that a receiving space for the suppression device is formed by the shielding element and the wall sections of the housing, which space is open towards the carbon holder plate and substantially closed to the side of the plug connection element. In other words, this means that the suppression device is arranged in a metallic receiving space which is bounded on one side towards the outside by the shielding element, so that the receiving space, together with the shielding element, acts a Faraday cage. On account of this design, the emission of electromagnetic radiation out of the housing in the region of the plug connection element is considerably reduced or at least virtually completely prevented.

Advantageous developments of the windscreen wiper motor according to the invention are specified in the dependent claims. All combinations of at least two of the features disclosed in the claims, the description and/or the figures are covered by the scope of the invention.

In order to construct a shielding element which is as cost-effective as possible and which furthermore provides a good shielding effect and can be easily inserted into the region of the plug connection region of the housing during installation of the suppression device or the carbon holder plate, it is further proposed that the shielding element is constructed as a shielding plate, that the shielding plate is constructed as a punched bent part, and that the shielding plate has spring sections bent around on marginal regions from the plane of the shielding plate, which lie against the wall sections of the housing. The spring sections particularly firstly provide reliable abutment of the shielding element against the wall sections of the housing and secondly allow the suppression device or the suppression housing to be inserted into the plug connection region without problems.

A very particularly preferred refinement of the suppression device makes provision for the use of Motor Line Feed-Through (MLFT) components. In connection with the use of components of this kind in a suppression device, it is proposed that the shielding element has at least one through-opening, through which a component of the suppression device projects, and that the component is a Motor Line Feed-Through (MLFT) component, which lies with its outer periphery against the shielding element in an electrically conducting manner in parts. A connection of this kind between the MLFT component and the shielding element allows a compact design of the suppression device together with good electromagnetic shielding.

In order to firstly be able to install the suppression device in advance and to be able to insert the said suppression device into the plug connection region of the housing as a structural unit, and secondly to allow the shielding plate, by way of its spring sections, to make electrically conductive contact with the wall regions of the housing, which wall regions surround the shielding plate, it is proposed in a further refinement of the invention that the suppression housing has open side faces at least in the region of the spring sections of the shielding plate, so that the spring sections project laterally over the suppression housing. On account of the spring sections projecting laterally over the spring sections, the requisite prestress which ensures that the spring sections lie securely on the (metallic) wall of the housing can be generated on the spring sections over the gap between the suppression housing and the plug connection region of the housing by means of the spring sections of the shielding plate.

A further, structurally advantageous embodiment of the suppression housing proposes that the shielding element is held in a fixed manner inside the suppression housing in guide elements. This prevents the shielding plate being moved counter to the installation direction on account of the friction which occurs between the spring sections and the wall sections and this resulting in an uncontrolled position of the shielding plate in the suppression housing, in the case of which even components of the suppression device could possibly be damaged, when the suppression housing is inserted into the plug connection region.

A fixed arrangement of the shielding element in the suppression housing can be implemented in a particularly simple manner when the guide elements are constructed in the suppression housing, consisting of plastic, as guide bars between which the shielding element is received in a form-fitting manner. The use of guide bars of this kind also allows relatively simple installation of the shielding element by the simple insertion of the shielding element between the guide bars when the components of the suppression device are installed.

When particularly high demands are made in respect of electromagnetic radiation emission by the windscreen wiper motor which is as low as possible, provision may be made, in particular, for the suppression device to embrace an (additional) printed circuit board with structural elements arranged thereon for suppression purposes, in particular in the form of SMD components, for the printed circuit board to be arranged in the region of the choke wire of the suppression choke, and for the printed circuit board to be connected with the shielding element in an electrically conducting manner via a connection element. In the case of the components being arranged on an (additional) printed circuit board in this way, a particularly compact design of the suppression device is achieved in spite of the additional components, wherein simple (ground) coupling between the printed circuit board and the shielding element is made possible by means of the connection element.

The invention also comprises a suppression assembly for a windscreen wiper motor, comprising a suppression device, able to be inserted into a suppression housing, with a shielding element, wherein the suppression housing is able to be introduced into a plug connection region of a housing of the windscreen wiper motor, and wherein the shielding element lies against metallic wall sections of the plug connection region of the housing. A suppression assembly of this kind can be installed in advance as a unit, has low electromagnetic radiation emission and is furthermore constructed in a particularly compact manner.

Figures 2, 7:
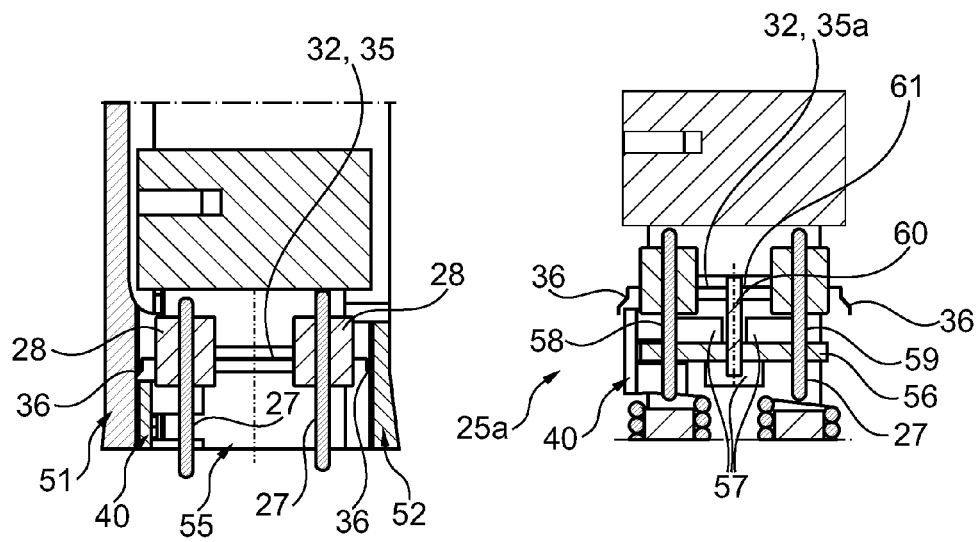
Figures 3, 4:
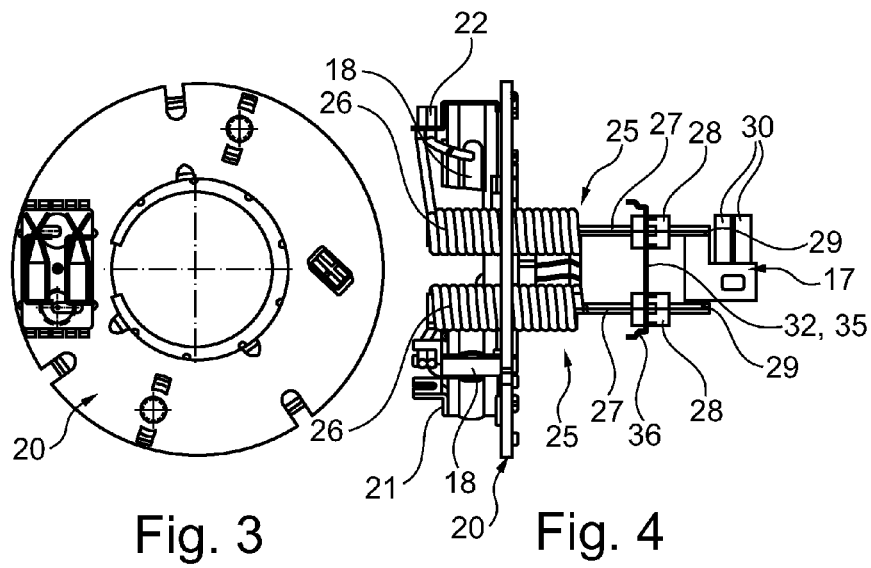
Figures 5, 6:
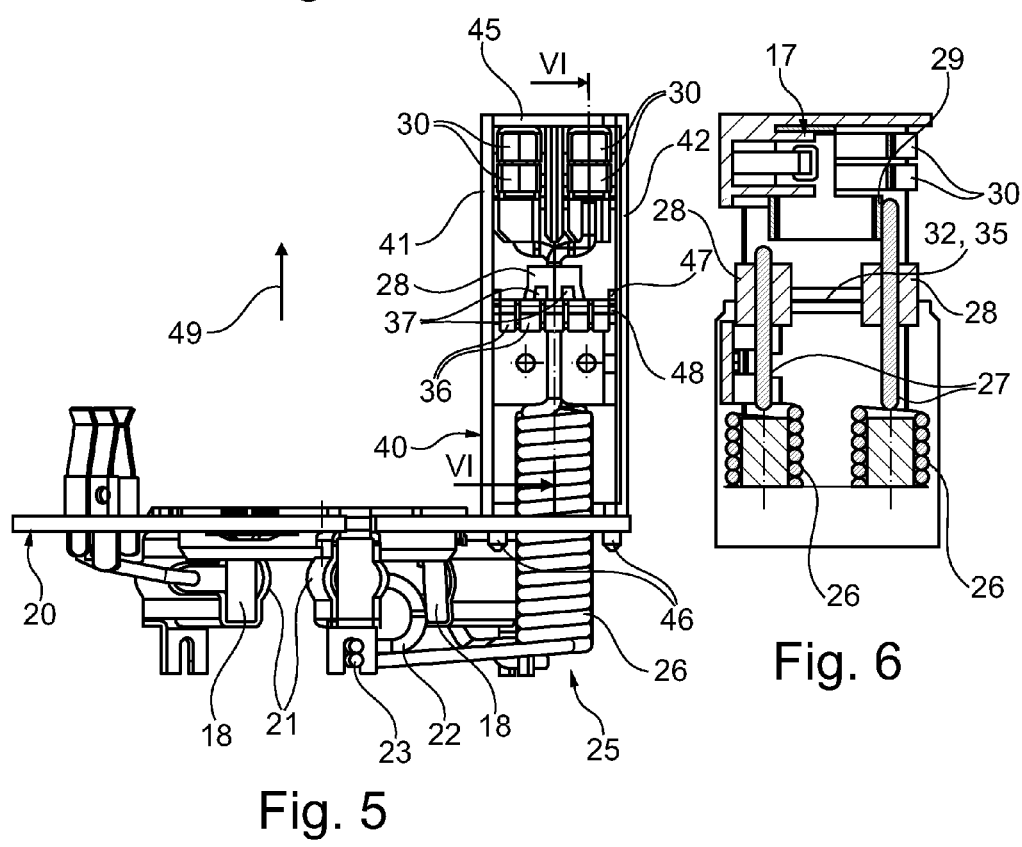
Figure 8:
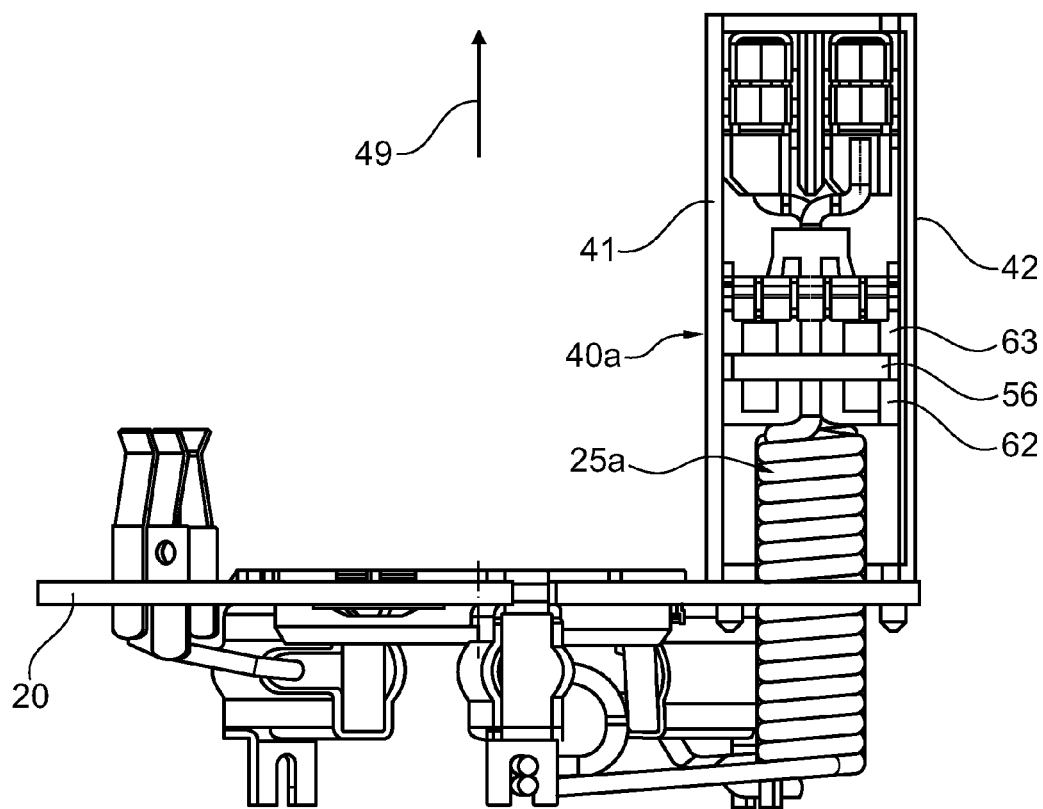

Further advantages, features and details of the invention can be found in the following description of preferred exemplary embodiments and with reference to the drawing, in which:

FIG. 1 shows a plan view of a windscreen wiper motor according to the invention, FIG. 2 shows an enlarged illustration of a section in plane II-II of FIG. 1, FIG. 3 shows a plan view of a carbon holder plate, FIG. 4 shows a side view of the carbon holder plate according to FIG. 3, FIG. 5 shows the carbon holder plate according to FIG. 4 with a suppression housing in a view which is rotated in relation to FIG. 4, FIG. 6 shows a section in plane VI-VI of FIG. 5, FIG. 7 shows an illustration according to FIG. 6 with a suppression device which is modified by an additional printed circuit board, and FIG. 8 shows an illustration according to FIG. 5 with a suppression housing which is modified by an additional printed circuit board.

Identical components or components with the same function are provided with the same reference numerals in the figures.

FIG. 1 shows a housing 11 of a windscreen wiper motor according to the invention. The housing 11 has a motor region 12 and a gear mechanism region 13. In the illustrated exemplary embodiment, the motor region 12 and the gear mechanism region 13 are integrally connected to one another, wherein the housing 11 is closed by a motor housing cover 15 on that side which is opposite the gear mechanism region 13. The housing is composed of metal, preferably of aluminium, in the gear mechanism region 13 and in the motor region 12 and is produced by pressure die-casting. In the gear mechanism region 13 of the housing 11, the said housing has a plug connection region 16 on its upper face, it being possible for the windscreen wiper motor 10 to be supplied with voltage by the cable harness of the motor vehicle by the insertion of corresponding plugs between the contacts of a plug connection element 17 via the said plug connection region.

An armature shaft with a laminated armature core and armature windings is arranged inside the housing 11 of the windscreen wiper motor 10 in a known manner, wherein the armature windings are soldered or welded to a commutator. The commutator cooperates with carbon elements 18, which are shown in FIGS. 4 and 5, by the end faces of the carbon elements 18 being pressed against the commutator.

Furthermore, a carbon holder plate 20, which is shown in FIGS. 3 to 5, is arranged fixed in position inside the housing 11. The carbon holder plate 20 serves to hold the carbon elements 18 in carbon holders 21 which are composed of sheet metal. The carbon elements 18 are connected to wire ends 23 of a suppression device 25 via electrical lines, in particular in the form of strands 22. The suppression device 25 comprises, as is shown particularly clearly in FIG. 4, a suppression choke 26 for each carbon element 18 (if this is not connected to ground), that wire end 27 of the said suppression choke which is opposite the wire end 23 being radially surrounded by an MLFT component 28 which acts as a suppression element. The wire ends 27 are, for their part, welded to contact areas 29 of the plug connection element 17 and are a constituent part of the voltage supply lines for the windscreen wiper motor 10.

The plug connection element 17 which is composed of sheet metal and is constructed as a punched bent part has connection lugs 30 in its region, which is averted from the contact areas 29, on its upper face, the said contact lugs resting one against the other in an elastically sprung manner and serving for contact to be made by the said plugs of the cable harness of the motor vehicle.

It is essential to the invention that the suppression device 25 is surrounded in the region of the MLFT components 28 by a shielding element 32 in the form of a shielding plate 35. The shielding element 35 essentially has a rectangular shape, as shown with reference to FIG. 3 in particular. Spring sections 36 which project out of the plane of the shielding plate 35 are constructed on the two relatively narrow sides of the shielding plate 35 by a bending/punching process. In order to route the (cylindrical) MLFT components 28 through the shielding region 35, the shielding plate 35 has corresponding through-openings in the region of the MLFT components 28. Furthermore, contact sections 37 which project in the direction of the plug connection element 17 and bear against the (ground) outer face of the MLFT components 28 under spring force, and therefore make electrical contact with the MLFT components 28, are formed by the shielding plate 35 by means of a punching/bending process.

As shown with reference to FIG. 5 in particular, the suppression device 25 described up to this point, with the exception of a subregion of the suppression choke 26, is arranged inside a suppression housing 40 which is composed of plastic.

The suppression housing 40 has two side walls 41, 42 and a termination wall 45 on that side which is averted from the carbon holder plate 20. The suppression housing 40 is connected to the carbon holder plate 20 by means of pin-like projections 46 which are formed through corresponding through-holes in the carbon holder plate 20 which is preferably composed of Pertinax. This is done by deformation, in particular by caulking, of the projections 46 against the carbon holder plate 20 on that side of the carbon holder plate which is averted from the suppression housing 40 (FIG. 5). FIG. 5 also shows, particularly clearly, that the regions of the shielding region 35 on which the spring sections 36 are constructed are arranged perpendicular to the side walls 41, 42 of the suppression housing 40. The suppression housing 40 does not have any side walls in these regions of the suppression housing 40, so that the spring sections 36 can project over the suppression housing 40 on both sides. FIG. 5 also shows that, in order to guide and position the shielding plate 35 inside the suppression housing 40, the suppression housing 40 has in each case two bar-like guide strips 47, 48 on its two side walls 41, 42, the shielding plate 35 being received in a form-fitting manner between the said guide strips.

The carbon holder plate 20 is produced together with the suppression housing 40 and the suppression device 25 as a prefabricated structural unit and, in order to be installed, is inserted into the housing 11 of the windscreen wiper motor 10 in the installation direction which is denoted by arrow 49 in FIG. 5. In the end position which is illustrated in FIG. 1, the connection lugs 30 of the plug connection element 17 are arranged in the plug connection region 16 of the gear mechanism region 13 in order to be connected to the plugs of the cable harness. Looking at FIGS. 1 and 2 together also shows that the housing 11 has wall sections 51, 52 in the gear mechanism regions 13 in the region of the spring sections 36, the said wall sections being composed of metal and being connected to ground potential and the spring section 36 of the shielding plate 35 bearing against the said wall sections with prestress. The wall sections 51, 52, together with the shielding plate 35, form a receiving space 55 for the suppression device 25 inside the housing 11 or in the gear mechanism region 13, wherein the receiving space 55 is bounded by the shielding element 32 or the shielding plate 35 in the direction of the plug connection element 17 and as a result acts like a Faraday cage.

FIG. 7 shows a modified suppression device 25a. The said modified suppression device additionally comprises, besides the components already known from the suppression device 25, a printed circuit board 56 on which a plurality of SMD components 57 are arranged for the purpose of achieving a better suppression effect. Wire sections 58, 59 of the suppression chokes 26 pass through the printed circuit board 56 and the said printed circuit board is electrically connected to the shielding plate 35a by means of a pin-like connection element 60 which has a corresponding through-opening 61 for receiving the connection element 60. In this case, it is essential for the additional components in the form of the SMD components 57 which are located on the printed circuit board 56 to be arranged in the region between the suppression chokes and the shielding plate 35a. FIG. 8 also shows a suppression housing 40a, which is modified in relation to the suppression housing 40, for receiving the suppression device 25a. The said figure shows, in particular, additional, bar-like guide elements 62, 63 which are arranged in the region of the two side walls 41, 42 and between which the printed circuit board 56 is received in a form-fitting manner and which prevent movement of the printed circuit board 56 in or counter to the installation direction (arrow 49).

The windscreen wiper motor 10 and, respectively, the suppression devices 25, 25a which have been described up to this point can be altered or modified in various ways without departing from the idea of the invention. For example, it is feasible to form the motor region 12 and the gear mechanism region 13 by separate housing components which are, for example, screwed to one another. It is only essential for a receiving space 55 to be formed in that region in which the suppression device 25, 25a is located when the windscreen wiper motor 10 is installed, the said receiving space 55 being composed of metal, being connected to ground potential and being bounded at the end, that is to say in the direction of the plug connection element 17, by a shielding plate 35, 35a which, for its part, bears in an electrically conductive manner against the metallic wall sections 51, 52 of the gear mechanism region 13.

LIST OF REFERENCE SYMBOLS

10 Windscreen wiper motor
11 Housing
12 Motor region
13 Gear mechanism region
15 Motor housing cover
16 Plug connection region
17 Plug connection element
18 Carbon element
20 Carbon holder plate
21 Carbon holder
22 Strand
23 Wire end
25 Suppression device
25a Suppression device
26 Suppression choke
27 Wire end
28 MLFT component
29 Contact area
30 Connection lug
32 Shielding element
35 Shielding plate
35a Shielding plate
36 Spring section
37 Contact section
38 (MLFT) component
40 Suppression housing
40a Suppression housing
41 Side wall
42 Side wall
45 Termination wall
46 Projection
47 Guide strip
48 Guide strip
49 Arrow
51 Wall section
52 Wall section
55 Receiving space
56 Printed circuit board
57 SMD component
58 Wire section
59 Wire section
60 Connection element
61 Through-opening
62 Guide element
63 Guide element

The invention claimed is:
1. A windscreen wiper motor, comprising:
a housing, wherein in the housing an armature shaft is arranged with a commutator which cooperates with carbon elements arranged in a region of a carbon holder plate, the carbon elements being connected in an elec- trically conducting manner with voltage supply lines via electrical connections in the form of strands, wherein the voltage supply lines are connected with the electrical connections via a suppression device arranged at least substantially in a suppression housing, which is connected with the carbon holder plate, and wherein the voltage supply lines are connected with at least one plug connection element, wherein the suppression device between the carbon holder plate and the plug connection element comprises on the side facing the plug connection element at least one metallic shielding element, the shielding element being arranged in the housing of the windscreen wiper motor, which is metallic at least in a region of the plug connection region, such that at least part of the shielding element lies directly against wall sections of the housing of the windscreen wiper motor lying at ground potential, surrounding the shielding element, wherein the shielding element is constructed as a shielding plate, the shielding plate is constructed as a punched bent part, and the shielding plate has spring sections bent around on marginal regions from the plane of the shielding plate, which lie against an inner surface of the wall sections of the housing, and wherein the suppression housing has open side faces at least in the region of spring sections of the shielding plate, so that the spring sections project laterally over the suppression housing.

2. The windscreen wiper motor according to claim 1, wherein a receiving space for the suppression device is formed by the shielding element and the wall sections of the housing, which space is open towards the carbon holder plate and substantially closed to the side of the plug connection element.

3. The windscreen wiper motor according to claim 1, wherein a component of the suppression device projects through the shielding element, and the component is a Motor Line Feed Through structural element, which lies with its outer periphery against the shielding element in an electrically conducting manner in parts.

4. The windscreen wiper motor according to claim 3, wherein the components of the suppression device embrace a suppression choke with a choke wire, wherein the choke wire projects through the Motor Line Feed Through structural element, and wherein the choke wire is connected at one end with the plug connection element.

5. The windscreen wiper motor according to claim 4, wherein the suppression device embraces a printed circuit board with structural elements arranged thereon, that the printed circuit board is arranged in the region of the choke wire of the suppression choke, and that the printed circuit board is connected with the shielding element in an electrically conducting manner via a connection element.

6. The windscreen wiper motor according to claim 5, wherein the printed circuit board is received in a form-fitting manner in two guide elements arranged on opposite sides of the suppression housing.

7. The windscreen wiper motor according to claim 5, wherein the structural elements of the printed circuit board are in the form of surface-mounted device (SMD) components.

8. The windscreen wiper motor according to claim 1, wherein the shielding element is held in a fixed manner inside the suppression housing at least in an installation direction of the suppression housing into the plug connection region in guide elements of the suppression housing.

9. A windscreen wiper motor, comprising:
a housing, wherein in the housing an armature shaft is arranged with a commutator which cooperates with carbon elements arranged in the region of a carbon holder plate, the carbon elements being connected in an electrically conducting manner with voltage supply lines via electrical connections in the form of strands, wherein the voltage supply lines are connected with the electrical connections via a suppression device arranged at least substantially in a suppression housing, which is connected with the carbon holder plate, and wherein the voltage supply lines are connected with at least one plug connection element, wherein the suppression device between the carbon holder plate and the plug connection element comprises on the side facing the plug connection element at least one metallic shielding element, the shielding element being arranged in the housing of the windscreen wiper motor, which is metallic at least in a region of the plug connection region, such that at least part of the shielding element lies directly against wall sections of the housing of the windscreen wiper motor lying at ground potential, surrounding the shielding element, wherein the shielding element is held in a fixed manner inside the suppression housing at least in an installation direction of the suppression housing into the plug connection region in guide elements of the suppression housing, and wherein the guide elements are constructed in the suppression housing, consisting of plastic, as guide bars between which the shielding element is received in a form-fitting manner.

* * * * *